(No Model.)

C. BAUER.
VEHICLE JUMP SEAT.

No. 283,370. Patented Aug. 21, 1883.

Attest
Carl Spengel

Inventor
Cornelius Bauer
by Knight Bros
Att'y's

UNITED STATES PATENT OFFICE.

CORNELIUS BAUER, OF CINCINNATI, OHIO, ASSIGNOR OF ONE-HALF TO THOMAS T. HAYDOCK, OF SAME PLACE.

VEHICLE JUMP-SEAT.

SPECIFICATION forming part of Letters Patent No. 283,370, dated August 21, 1883.

Application filed December 27, 1882. (No model.)

*To all whom it may concern:*

Be it known that I, CORNELIUS BAUER, of Cincinnati, Hamilton county, Ohio, have invented a new and useful Improvement in Jump-Seats for Vehicles, of which the following is a specification.

My invention relates to improvements in those vehicles whose seats are capable of being readily shifted, either singly or collectively, to different positions to suit the convenience of the occupants.

Figure 1:
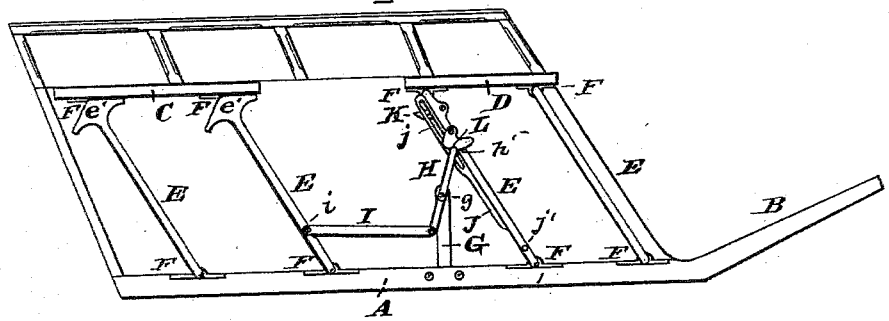
Figure 2:
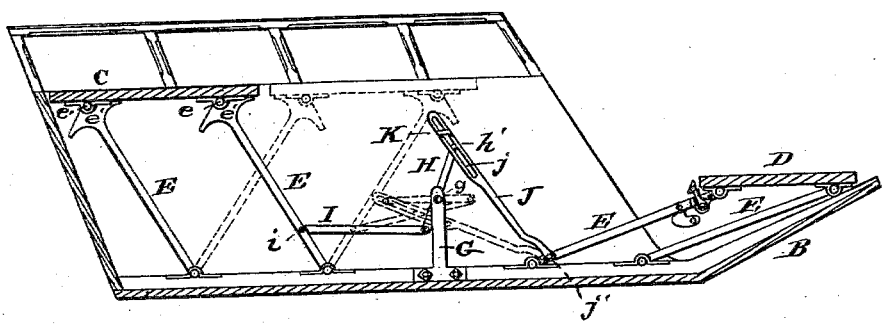
Figure 3:
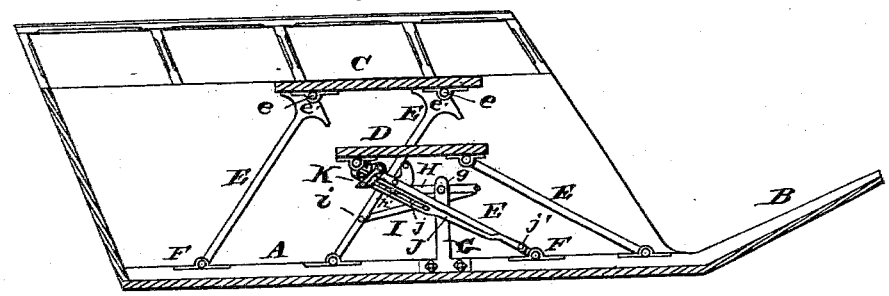
Figures 4, 5:
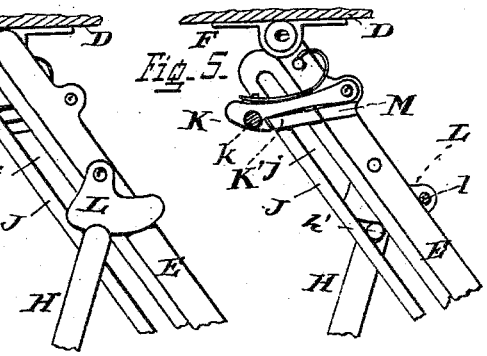

In the accompanying drawings, Figures 1, 2, and 3 are similar sectional elevations, showing four diverse arrangements of seats in a convertible one or two seated vehicle embodying my invention. Figs. 4 and 5 show to a larger scale my automatic lock as applied to the left and right hand seat-connections, respectively.

A may represent the floor, and B the foot-board, of a carriage or vehicle. C is the rear and D the front seat.

The parts now to be described represent the left-hand one of two precisely-identical apparatus, which coact to support the two seats in the several positions indicated.

E are legs, which terminate in wrists or pivots $e$, that occupy boxes F, attached to the floor and to the under sides of the seats, respectively. Each leg of the rear seat terminates in an obliquely-angular "T-head," $e'$, which serves to support the seat either in the rearward position, as shown in Figs. 1 and 2, or in the forward position, as shown by strong lines in Fig. 3 and by dotted lines in Fig. 2. A brace post, G, carries at or near its upper end the fulcrum $g$ of a lever, H. A pivot, $h$, at one end of the lever H, connects the said lever to a rod, I, a pivot, $i$, on which connects said rod with a front leg of the rear seat. The other end of the lever H has a wrist, $h'$, that occupies a slot, $j$, in an arm, J, whose lower extremity is coupled by a pivot, $j'$, to a rear leg of the front seat. A spring-catch, K, serves to automatically lock together the arm J and the seat-leg to which it is pivoted, as shown in Figs. 1 and 3. The catch K engages over a striker, K'. A cam or button, L, which can be made to bear against the wrist $h'$, or which does so automatically by the force of its own gravity, serves to lock the wrist to the position shown in Fig. 1, and co-operates with the parts hereinbefore mentioned to hold both seats securely to the positions indicated in that figure, thus affording a two-seated vehicle for adults. Simply unfastening the locks K L liberates the front seat, D, for being shifted to its more forward and lower position, (shown in Fig. 2,) either to facilitate entrance or exit of passengers, or for the use of children. Accompanying such transposition of the forward seat, D, the rear seat, C, with its attachments, may be shifted to the more forward position indicated by dotted lines in Fig. 2 and by strong lines in Fig. 3. Still another arrangement of the parts is shown in Fig. 3, in which, the front seat being drawn backward and downward, and the rear seat being drawn forward, the device is converted into a single-seated vehicle.

Simultaneous liberation of the locks K and L on both sides of the vehicle is facilitated by handles $k\ l$, which, extending athwart the vehicle below the seat, are common to the similar catches on both sides.

Rests M prevent the catches K falling below their normal position.

I claim herein as new and of my invention—

1. In a vehicle, the arrangement of two seats, C D, hinged or pivoted to oscillating legs E, in the described combination with brace-post G, lever H, rod I, and the slotted arm J, hinged or pivoted to the rear leg of front seat, substantially as set forth.

2. In combination with the seats C D, oscillating legs E, brace-post G, lever H, rod I, and hinged and slotted arm J, the self-locking clasp K, for the purpose explained.

3. In combination with the arm J, hinged to a rear leg of the front seat, and with the sliding connection H, the locking-cam L, for the purpose set forth.

In testimony of which invention I hereunto set my hand.

CORNELIUS BAUER.

Attest:
GEO. H. KNIGHT,
SAML. S. CARPENTER.